United States Patent Office 3,397,077
Patented Aug. 13, 1968

---

3,397,077
METAL FINISHING PROCESS AND COMPOSITION THEREFOR
Ernest R. Boller, Marion, and Gerald E. Snider, Muncie, Ind., assignors, by mesne assignments, to Ernest R. Boller, Detroit, Mich.
No Drawing. Filed May 14, 1963, Ser. No. 280,460
24 Claims. (Cl. 148—6.15)

This invention relates to methods and compositions for finishing metals and for applying protective coatings thereto.

It is generally recognized that for satisfactory use under corrosive conditions the majority of common metals must be provided with a protective coating or film on the surface thereof or otherwise treated in order to prevent or retard corrosion. Thus, metals which in service are subject to severe corrosion conditions, due to oxidation, exposure to chemicals or corrosive liquids, sprays and so forth, must be protected in some way in order to retard corrosion on the surfaces thereof. This is true not only with respect to iron and steel, but also with respect to such other commonly used metals as aluminum, magnesium, zinc, copper and the like when used alone or in conjunction with other metals. In many instances it is permissible to apply to the metal surfaces a protective and decorative coating of paint, lacquer or enamel. However, achieving satisfactory adherence of the paint or similar coating to the metal is not always readily accomplished. Before applying such coatings to metal surfaces it is generally the practice to pretreat the metal surfaces which involves roughening the surface by chemicals or otherwise to improve the bond between the metal surface and the coating material. However, with certain metals such as aluminum, magnesium and zinc, satisfactory adherence of the organic paint or similar coating to the metal is not altogether satisfactory.

It is also true that in many instances protective coatings of paint or enamel or like materials are not satisfactory for use on metal surfaces because it is desired to maintain substantially the original appearance and surface characteristics of the metal.

Moreover, aside from the corrosion protection standpoint, there is definite need in the metal finishing industry for compositions which can be used to polish the metal surface thereby improving its brightness and smoothness.

It is an object of this invention to provide a simple and low cost process for applying to metal surfaces a protective coating which does not materially change the appearance or surface texture of the metal and which effectively protects the surface against corrosion.

It is another object of this invention to provide a process for treating metals so as to finish or polish the surfaces thereof thereby improving the brightness and smoothness of the metal surfaces.

It is another object of the invention to provide a process for treating metals so as to improve the bonding characteristics of the metals with organic coating materials such as paints, enamels and the like.

It is another object of the invention to provide a process of treating metals so as to polish the surfaces of the metal and simultaneously form a protective film thereon.

It is a further object of the invention to provide a composition for treating metals whereby a coating is applied to the surfaces of the metal which protects the metal from corrosion but which does not materially change the appearance or surface texture of the metal.

It is a still further object of the invention to provide a composition for treating metals whereby the bonding characteristics thereof with organic coating materials such as paints, enamels or the like are improved.

It is a still further object of the invention to provide a composition for treating metals whereby the metal surfaces are polished with resulting improvement in the brightness and smoothness thereof.

It is another object of the invention to provide a composition for treating metals whereby the surface of the metal is polished and simultaneously a protective film is formed thereon.

In accordance with the present invention there are provided novel compositions of matter and processes for treating metals to finish or polish the surfaces thereof and to form a protective film on the surface of the metal. The novel compositions of this invention comprise water as a base, an inorganic oxyacid or salts thereof and an organic material capable of forming on the metal surface a substantially water-insoluble resinous film.

A variety of organic resin-forming materials can be employed in the metal treating compositions of this invention. Representative of suitable resinous materials are amine resins including an amine such as urea, thiourea, melamine, hexamethylenediamine or ethylenediamine in combination with an aldehyde such as formaldehyde, acetaldehyde or furfuraldehyde; polyamide resin constituents including a polyamine as hexamethylene diamine, ethylene diamine or one of the above amine resins in combination with a polycarboxylic acid such as adipic acid, sebasic acid, succinic acid, azelaic acid, fumaric or maleic acid, oxalic acid, phthalic acids, citric acid and the like; polyester resin constituents including a combination of one or more polyhydric alcohols such as glycerol, ethylene glycol, propylene glycol, butylene glycol, diethylene glycol, pentaerythritol, mannitol or cyclohexylene diethylene glycol, with a polycarboxylic acid or mixture thereof as adipic, fumaric or maleic, succinic, azelaic, phthalic, isophthalic or terephthalic. Various combinations of the above types of primary resins are eminently suitable.

Resin-forming materials which copolymerize with one of the primary resins, as for example a phenol-aldehyde with an amine resin, can likewise be employed. Examples of phenolaldehyde constituents are phenol-formaldehyde, phenol-furfuraldehyde, phenol-butyraldehyde, phenol-acetaldehyde, phenol-hexamethylenetetramine, cresol-formaldehyde, and resorcinolformaldehyde.

In addition to the above resin-forming materials or combinations thereof, there can be employed materials which react with a primary resin to form as it were a secondary resin film on the metal undergoing treatment. Thus, for example, a primary amine resin such as urea-aldehyde can be treated with a polycarboxylic acid to form a polyamide type resin layer on the primary resin film. Likewise, a primary resin having an excess of a polycarboxylic acid can be reacted with a polyhydric alcohol to form a polyester resin layer on the primary resin layer, or an amine or polyamide primary resin containing a polyhydric alcohol can be reacted with a solution of a polycarboxylic acid to form a polyester surface on the primary resin film.

Similarly, special surfaces can be developed on the metal undergoing treatment by treating a primary resin film with suitable monofunctional compounds. For example, a paraffin-like surface can be obtained by treating a primary amine or polyamide resin film with a solution of a sodium or potassium salt of a long chain fatty acid such as stearic, oleic, palmitic or myristic. An aromatic hydrocarbon surface may be obtained by treating the primary resin with a sodium, potassium or ammonium salt of benzoic acid, naphthoic acid, phenol or naphthol. A chlorinated aromatic hydrocarbon surface can be obtained by similar treatment with a solution of a sodium, potassium or ammonium salt of dichlorphenol or tetrachlorphenol. One may also use low molecular weight monofunctional compounds not to build up the resin film or to modify radically the nature of its surface, but in order to block active groups and render the resin surface less chemically active; thus, for example, one can block amine or amide groups or alcohol groups with formic or acetic acids and acid groups with methanol or ethanol.

The resin deposited on the metal in accordance with the invention can comprise monomers copolymerized with a primary resin film. Thus, a polyester of a polyhydric alcohol and a polycarboxylic acid containing an unsaturated bond can be treated with a solution or an emulsion of an unsaturated monomer such as styrene, methylmethacrylate, vinyl toluene or diallyl phthalate and copolymerization obtained on heating. Such monomers may be applied from a solution in an organic solvent, as methanol or ethanol, or from an aqueous emulsion. Similarly, the primary resin film on the metal surface can serve as a polymerizing or curing agent for another type of resin. For example, a primary resin film containing an amine resin, a polyamide or a phenol-aldehyde can be treated with a solution of an epoxide, as epichlorohydrin, and a polyhydroxyl compound, as a glycol, glycerol, hydroquinone, resorcinol, or diphenylol propane.

It is apparent that a wide variety of resins or resin-forming components can be employed in accordance with the present invention. In general, the resin-forming components employed in the metal treating compositions of the invention should be soluble in aqueous acid solutions and they should be capable after deposition on the surfaces of a metal of undergoing a reaction resulting in the formation of a substantially water-insoluble resin-like material.

The resin-forming materials are employed in the compositions of the invention in the unreacted or partially reacted state and thereafter completion of a reaction is effected to produce the desired result. A partially polymerized resin can be formed in situ or prior to incorporation into the metal treating composition. Of the various combinations of materials mentioned above, urea and formaldehyde are particularly well suited for the practice of the invention in that, in an intermediate or partially reacted state, these materials are productive of a water-soluble solid. Moreover, with the use of urea and formaldehyde, polymerization to form the final resin can be achieved rapidly at slightly elevated temperatures with the inorganic oxyacid or organic polycarboxylic acid present in the metal treating composition serving as the polymerization catalyst. The ratio of resin-forming ingredients can be varied widely over the range normally used in the art for preparation of the final water-insoluble resins. With the preferred urea-formaldehyde materials the ratio of combined formaldehyde to combined urea in the final resin is normally within the range of about 1.5:1 to 3:1 (mol proportions). The resins are employed in the metal-treating compositions of the invention in amounts ranging from about 1 to about 50% by weight of the composition, preferably about 10 to about 30% by weight. A lower range of resin concentration in the treating composition of the invention is preferred when a very thin film of protective resin is desired on the metal surfaces and when a thick resin film is desired on the metal surfaces higher concentrations of the resin should be employed.

An inorganic oxyacid is employed in the metal treating compositions of the invention in an amount sufficient to effect reaction between the treating composition and the metal surface. Generally the inorganic oxyacid is employed in an amount ranging from about 1 to about 75% by weight of the composition, preferably about 10 to about 30% by weight. With compositions intended for use in treating such highly reactive metals as zinc or magnesium it is often preferable to use a low acid concentration or in appropriate cases to partially neutralize the acid with a base. In the latter case it is preferable to use the free acid initially in the preparation of the composition and subsequently neutralize to the desired extent prior to use. A high concentration of inorganic oxyacid together with high resin concentrations are preferred when preparing metal treating compositions which will be diluted prior to actual use in treating metals.

Representative inorganic oxyacids suitable for use in the metal treating composition of the invention include sulfuric, sulphamic, boric, phosphoric and nitric. Phosphoric acid is a particularly preferred acid and in some instances, such as when a high degree of polishing is desired, it is preferred to employ a combination of phosphoric acid and nitric acids. This combination of phosphoric acid and nitric acid is preferred also in instances where the resinous component of the composition comprises a urea-aldehyde resin in which the mole ratio of aldehyde to urea is less than about 2. The inorganic oxyacids, in appropriate cases, can be employed in the form of their partially neutralized salts such as, for example, acid phosphate salts. Representative phosphate salts which can be employed in lieu of phosphoric acid itself are ammonium dihydrogen phosphate, sodium dihydrogen phosphate, potassium dihydrogen phosphate. For lower acidities these primary phosphates may be combined with corresponding secondary phosphates. Other phosphates that can be present include those of the metal being treated, such as aluminum dihydrogen phosphate, zinc dihydrogen phosphate, magnesium dihydrogen phosphate, copper dihydrogen phosphate, iron dihydrogen phosphate.

As indicated, the liquid compositions of the invention comprise aqueous solutions in which water is employed as a base. Generally it is preferred that the amount of water in the composition be not less than about 15% by weight. However, for convenience in manufacture and transportation, the metal treating solutions can be prepared in concentrated form, after which they can be diluted prior to use.

A typical preferred metal treating composition of this invention has the following makeup:

| | Percent by weight |
|---|---|
| Urea-aldehyde resin | 10 |
| Phosphoric acid | 20 |
| Nitric acid | 3 |
| Adipic acid | 7 |
| Water | 60 |

The metal treating compositions of the invention can be prepared in several ways. For example, urea and formaldehyde or equivalent resin-forming ingredients can be separately incorporated into the aqueous inorganic acid solution and the solution digested at an elevated temperature, such as above 175° F. and preferably from 200 to 210° F. to induce partial polymerization of the resin-forming components while still maintaining the liquid condition desired. Polymerization should not be permitted to proceed at this time to a stage where the resin becomes insoluble in the aqueous composition. In those instances where nitric acid is employed in the composition, it is preferred to add it at intervals during this partial polymerization period since higher nitric acid concentrations initially may result in some loss of urea, formaldehyde and nitric acid. A polycarboxylic acid, if one is employed, can be present initially in the aqueous solution or can be added after the resin is formed. Agitation of the reaction mixture at the time of addition of the various components and during the partial polymerization stage is advisable. Instead of adding the urea and formaldehyde or other resin-forming ingredients as such, one of the commercially available partially polymerized urea-formaldehyde solutions may be used such as, for example, one consisting of 60% formaldehyde, 25% urea and 15% water.

Metal treating compositions comprised of the above-named components are admirably adapted for use as metal finishing or polishing compositions and also for applying to metal surfaces a resinous film which will protect the metal against corrosion from such external sources as ordinary atmospheres, various industrial atmospheres, exposure to solvents and chemicals, corrosive sprays and the like. The aqueous liquid compositions of the invention can be advantageously employed as a bath into which the metal to be treated is immersed for a short period as, for example, 2 to 30 seconds at high temperatures or a few minutes (1-5 minutes or more) at ambient temperatures. Other methods of applying the treating composition to the metal, such as spraying, can be employed satisfactorily. As a result of contacting the metal with the liquid compositions of the invention, the surface of the metal is polished with resulting improvement in the brightness and texture thereof. At substantially the same time as the metal polishing action is accomplished, a resinous film is bonded to the metal surface which acts as a protective coating therefor and protects the metal against corrosion. The exact period of immersion or contact time between the metal undergoing treatment and the liquid treating compositions of the invention depends upon several factors including the reactivity of the particular metal being treated with the treating composition, the temperature at which the operation is conducted, the degree of metal polishing desired, the thickness of the protective film desired on the metal surface and so forth. As would be expected, shorter contact times between the metal and the metal treating composition result in less polishing action on the metal surface as well as minimum deposition of the resin film on the surface.

The temperature of the liquid treating bath at the time of immersion of the metal therein can vary widely and can range from ambient temperatures up to the boiling point of the liquid bath. Likewise, the temperature of the metal itself at the time of treatment can be varied and can range from ambient temperatures up to 900° F. Temperatures sufficiently high as to cause softening of the metal undergoing treatment should not be employed however. Heating the metal itself before immersion thereof into the treating solution is preferred in some instances and provides certain advantages such as shortening of the required immersion time, use of lower temperatures in the treating bath and lower acidity in the treating bath. Moreover, immersion into the treating bath of a metal which is at a relatively high temperature generally results in a more brilliant finish thereon than could otherwise be obtained. For example, with aluminum an almost mirror-like surface can be produced by heating the aluminum to a temperature ranging from about 400 to 900° F. before immersion into the treating solution. On the other hand, when aluminum is introduced into the treating solution at ambient temperatures, other conditions being the same, the finish obtained is less mirror-like and is more in the nature of a satin-like finish. Thus, it is apparent that the process of the present invention is flexible and one practicing the invention may vary the make-up of the treating solution and the conditions under which the metal treating operation is conducted in accordance with the desired objectives.

In an alternative method of treatment to that described above, the metal is passed through the metal treating composition of the invention, rinsed and then passed through a secondary treating solution containing a reactable material such as, for example, a carboxylic acid, a salt thereof, a phenol or similar aromatic compounds and salts thereof. Representative salts which can be employed in this secondary treating solution include, for example, sodium and potassium stearate, ammonium adipate, ammonium oxalate, sodium and potassium benzoate, mono- and diammonium phthalate, ammonium dichlorphenate, sodium tetrachlorphenate, sodium phenate and the like. When treating metal according to this embodiment of the invention it is believed that a resin film is first formed on the metal surface as described above. On passing through the secondary treating solution, it is postulated that the organic acid or other component thereof combines with the original resin film on the metal surface through amide or ester linkages, producing a final film on the metal surface having desirable properties conferred by the principal component of the secondary treating solution. Thus, for example, with a primary urea-aldehyde resin and a secondary adipic acid solution a final film is obtained on the metal surface having many of the properties of a conventional polyamide resin.

After immersion of the metal in the treating bath for a suitable time, it is removed therefrom and rinsed if desired or necessary to remove excess treating solution. The treated metal can then, if desired, be heated to temperatures on the order of 225° F. to 400° F. in order to speed up and complete polymerization of the resin film on the metal surface. Here again the procedure to be followed is susceptible to variation. If the surface is merely rinsed and allowed to dry at atmospheric temperatures, polymerization of the resin film is relatively slow with consequent slow development of resin. The polymerization of the resin film can be accelerated by heating to an elevated temperature, the optimum temperature depending on the specific composition of the resin film. Likewise, the more acidic the treating composition, the quicker will be the curing time of the resin and with highly acidic compositions heating of the metal after treatment may not be necessary to accomplish satisfactory curing of the resin film.

A preferred embodiment of the process of this invention is as follows:

A clean aluminum surface is immersed for 2 seconds at a temperature of 185° F. in a solution consisting of 10% by weight partially polymerized urea-formaldehyde resin, 20% by weight phosphoric acid, 3% by weight nitric acid and water constituting the remainder. After removal from this bath the aluminum surface is rinsed with water and heated to 300° to 400° F. The presence of the plastic film is readily discernible on the aluminum surface upon removal from the treating bath. When heated to the indicated temperature following rinsing, further polymerization of the film is indicated by an increase in brightness and the development of a lustrous appearance. At the same time that the resin film is being deposited on the metal surface, the smoothness and brightness of the surface are improved by the polishing action of the treating bath. The net results are the production of a bright lustrous aluminum surface which persists under corrosive conditions. Aluminum surfaces finished in this way have been found to retain their appearance with the surface remaining substantially unchanged for periods of six months or more in chloride-containing atmospheres which caused noticeable pitting of unprotected aluminum surfaces in two days.

According to another embodiment of this invention, 5% by weight of adipic acid is dissolved in the treating solution specified above. A clean aluminum surface is immersed in this solution at about 185° F. for 2 seconds. The aluminum is removed from the solution, rinsed with water and heated to about 250° F. Further polymerization of the resin film on the metal can be observed as described above. The final aluminum surface obtained in this manner is generally brighter and more lustrous than that described above. Moreover, it is more corrosion resistant under severely corrosive conditions and more compatible with different kinds of superimposed organic coatings such as paint and enamels than the coating described in the preceding paragraph.

According to a further embodiment of the invention, a modified urea-formaldehyde resin film is first formed on an aluminum surface in the manner previously described. The aluminum surface is then removed from the treating solution, rinsed with water and immersed for 1 minute in a 10% by weight aqueous solution of adipic acid. It is removed from this solution, rinsed and heated to about 250° F. The further polymerization of the resin film may be observed as described above. The brightness and luster of the final aluminum surface obtained is generally superior to that in either of the two preceding cases. It also exhibits greater resistance to agents which normally cause severe corrosion.

No theory is advanced as to why the compositions of the invention used as set forth herein produce the highly beneficial effects realized. It is found that the combination of phosphoric, nitric acid and resin-forming material in the treating solution chemically polishes the metal surface, improving its brightness and smoothness, and simultaneously a film is bonded to the metal surface, which film markedly improves the luster or sheen of the metal surface.

The following specific examples will further illustrate the present invention and the advantages thereof.

Example 1

A metal treating solution designated solution "A" was prepared in accordance with the invention as follows: 136 lbs. of 37% formaldehyde, 236 pounds of 85% phosphoric acid, and 20 pounds of 42° Bé. nitric acid were added to 508 pounds of water. The solution was heated to 150° and 50 pounds of urea added. This composition was digested at 200°–210° F. for 25 hours with the addition of 50 pounds of 42° Bé. nitric acid in small portions over the first half of this digestion period.

Panels of commercially pure aluminum sheet were dipped in the above solution for 5 seconds at 180° F., rinsed with water and dried at room temperatures. The aluminum surface was appreciably brightened by action of the bath and carried a discernible plastic film. This film hardened and increased in sheen over a period of days at room temperature. The aluminum could be bent, twisted, and otherwise worked and distorted without destruction or rupture of the plastic film. When exposed at room temperatures to a chloride-containing atmosphere these treated panels showed no corrosion or diminution of brightness after two months. With companion panels of unprotected aluminum there was pitting and appearance of white corrosion products within two days. The plastic coated aluminum surface was very receptive to paint and after drying the adhesion of paint to the coated metal was very good.

Panels of low carbon steel sheet coated with commercially pure aluminum were treated as described above. The results were the same.

Panels of clean low carbon steel sheet were dipped in solution "A" at 190° F. for 15 seconds, rinsed with water and dried at room temperatures. The steel surface was brightened by the treatment and carried a discernible plastic film. This film increased in hardness over a period of days. It was not destroyed by working the metal. When exposed at room temperature to a chloride-containing atmosphere it showed no evidence of rusting after two weeks. With an untreated companion panel under the same conditions of exposure, rust spots appeared within an hour.

Example 2

Panels of carbon steel coated with commercially pure aluminum were dipped in solution "A" of Example 1 at 185° F. for 5 seconds and rinsed with water. Adhering water was blown off, and the panels were then heated to about 300° F. in an electric furnace. The aluminum surface was appreciably brightened while in the treating bath. The plastic film on the aluminum surface very noticeably increased in luster during the final heat treatment as the temperature approached 300° F., due to further resin polymerization effected by the heat. The final finish was significantly brighter than that obtained in Example 1. The corrosion resistance of the treated metal was also superior, especially under severe corrosion conditions. Otherwise, the properties of the final aluminum surface were comparable to those described in Example 1.

Example 3

Panels of carbon steel coated with commercially pure aluminum were heated to 600° F., dipped in solution "A" of Example 1 at room temperature for 2 seconds, rinsed with water and dried at room temperature. A very bright lustrous finish was obtained, the polishing action of the bath under these conditions markedly improving both the brightness and smoothness of the aluminum surface. Heating to about 300° F. improved brightness slightly. Other properties of the plastic film on the surface were comparable to those obtained in Example 2.

Example 4

Specimens of carbon steel tubing were coated with aluminum. After completion of the coating operation and removal of excess aluminum the specimens were cooled to about 900° F., and quenched in solution "A" from Example 1, rinsed with water and dried at about 250° F. A highly lustrous finish was obtained, slightly more highly polished than but otherwise comparable to that obtained in Example 3.

Example 5

A treating solution wa sprepared by adding 25 parts by weight of a commercial partially polymerized urea-formaldehyde solution (25% urea, 60% formaldehyde), 36 parts by weight of 85% phosphoric acid, and 4.2 parts by weight of 42° Bé. nitric acid to 233 parts by weight of water. The solution was heated to 150° F. and 6 parts by weight of melamine added. The composition was digested at 200°–210° F. with agitation for 120 hours, an additional 8.4 parts by weight of 42° Bé. nitric acid being introduced in small portions from time to time.

Carbon steel bolts and nuts coated with commercially pure aluminum were heated to 700° F. and dipped in the above solution at room temperature for 3 seconds, rinsed with water and dried at about 250° F. Reaction between the aluminum and the bath stopped after 1 second. The character of the finish obtained and of the plastic film on the aluminum surface was comparable to that of Example 3, except that it afforded somewhat greater corrosion protection to the aluminum under severe conditions.

Example 6

Solution "A" of Example 1 was partially neutralized with concentrated ammonium hydroxide to a pH of 2. Specimens of galvanized steel sheet at room temperatures were dipped into this solution at 170° F. for 5 seconds, rinsed with water and dried at about 250° F. The brightness and smoothness of the zinc surface were appreciably improved. The plastic film formed on the zinc surface significantly improved corrosion resistance in chloride-containing atmospheres. It also protected the zinc surface against "white rusting" in atmospheres conducive to this type of corrosion, i.e., high humidity and high carbon dioxide content. Use of longer immersion times in the treating process produced heavier and somewhat more opaque plastic films on the zinc surface.

Specimens of magnesium plate at room temperature were dipped in this solution at 185° F. for 15 seconds, rinsed with water and dried at about 300° F. A bright finish was obtained on the magnesium surface. The plastic film formed on this surface afforded excellent protection for the magnesium against a chloride-containing atmosphere.

Example 7

Five percent by weight of ammonium oxalate was dissolved in solution "A" of Example 1. Panels of steel coated with commercially pure aluminum were immersed in this solution at 185° F. for 5 seconds, rinsed with water and dried at about 300° F. The finish obtained was brighter than in Example 2, and the plastic film on the surface gave appreciably greater corrosion protection under severe conditions.

Example 8

Ten percent by weight of adipic acid was dissolved in solution "A" of Example 1. Panels of aluminum coated steel were heated to 700° F., dipped in this solution at 180° F. for 3 seconds, rinsed with water and dried at about 250° F. The high finish on the treated aluminum surface was similar to that obtained in Example 3. The plastic covered surfaces were significantly more corrosion resistant than in Example 3. The mechanical characteristics were at least equal to those obtained by treatment with solution "A," in Example 1. The physical and chemical properties of the film were typical of a polyamide type resin.

Example 9

Panels of commercially pure aluminum sheet were immersed in solution "A" of Example 1 at 185° F. for 3 seconds, rinsed with water, immersed in a 10% by weight aqueous solution of ammonium oxalate for 1 minute, rinsed with water and dried at about 325° F. The reflectivity of the surface increased markedly when dipped in the oxalate solution. The final finish was much brighter than in Example 2, and somewhat brighter than in Example 7. Other properties of the plastic film were similar to those in Example 7.

Example 10

Carbon steel specimens coated with commercially pure aluminum were dipped in solution "A" of Example 1 at 180° F. for 3 seconds and rinsed with water. Thereafter the treated specimens were immersed in a warm 10% by weight aqueous solution of succinic acid for 3 minutes, rinsed with water and dried at about 275° F. Reaction of the carboxylic acid with the resin film from solution "A" was as marked as in Example 9.

Final polymerization of the plastic film occurred at a lower temperature than in Example 9, or Example 2. The final finish was superior to that in Example 9 and possessed better corrosion resistance under severe conditions.

Example 11

Carbon steel specimens coated with commercially pure aluminum were heated to 700° F., immersed in solution "A" of Example 1 at room temperature for 2 seconds and rinsed with water. Thereafter the treated specimens were immersed in a warm 10% by weight aqueous solution of adipic acid for 2 minutes, rinsed with water and dried at 250° F. There was the usual increase in brightness of the surface in each of the treating baths and during final heating. Final polymerization of the plastic film occurred at a lower temperature than in Example 10. The final finish was similar to that in Example 10, but presented more of a satin-like appearance and possessed properties of a conventional polyamide type resin.

Example 12

Panels of commercially pure aluminum were heated to 600° F., immersed for 2 seconds in solution "A" of Example 1, rinsed with water and then immersed in 10% by weight aqueous solution of citric acid for 1 minute, rinsed with water and dried at about 300° F. A moderately bright finish was obtained and a plastic film formed on the aluminum surface.

Example 13

Panels of commercially pure aluminum sheet were heated to 600° F., dipped in solution "A" of Example 1 for 2 seconds, rinsed with water and then dipped in a warm 10% by weight solution of ammonium benzoate for 2 minutes, rinsed with water and dried at about 300° F. A fairly bright finish was obtained. The plastic film on the aluminum possessed surface properties resembling those of an aromatic hydrocarbon.

Example 14

Panels of commercially pure aluminum sheet were heated to 600° F., dipped in solution "A" of Example 1 for 2 seconds, rinsed with water and then immersed in a warm 0.5% by weight aqueous solution of sodium stearate for 3 minutes, rinsed with water and dried at about 350° F. A very bright finish was obtained. The plastic film on the aluminum surface possessed properties similar to a long chain aliphatic hydrocarbon.

Example 15

A solution identical to solution "A" of Example 1, except that 32 parts by weight of furfuraldehyde were substituted for 27 parts by weight of 37% formaldehyde, was prepared by digesting the components at 190° F.–210° F. for 120 hours. Specimens of commercially pure aluminum sheet were heated to 600° F., dipped in the solution at 185° F. for 3 seconds and rinsed with water. The treated specimens were then immersed in a warm 10% by weight solution of ammonium acid phthalate for 3 minutes, rinsed with water, and dried at about 300° F. A bright, highly polished aluminum surface was obtained. Reaction between the hot metal and the first solution stopped in less than 1 second with formation of plastic film. The final film afforded excellent corrosion protection under severe conditions.

Example 16

Specimens of commercially pure aluminum sheet were heated to 600° F., dipped in solution "A" of Example 1 at room temperature for 2 seconds, rinsed with water and then immersed in a warm 7% by weight aqueous solution of ammonium dichlorphenate for 2 minutes, rinsed with water and dried at about 300° F. A good polished surface was obtained with a satin-like appearance. Surface characteristics of the plastic film on the aluminum resembled those of a chlorinated aromatic hydrocarbon.

Example 17

Panels of commercially pure aluminum sheet were treated exactly as in Example 16 except that a 5% by weight aqueous solution of sodium phenate was substituted for the ammonium dichlorphenate. A well polished bright aluminum surface was produced, and the plastic film adhering to the surface possessed properties resembling those of an aromatic hydrocarbon.

Example 18

Twenty parts by weight of a commercial partially polymerized urea-formaldehyde solution (25% urea, 60% formaldehyde), 70.5 parts by weight of 85% phosphoric acid, 12 parts by weight of 42° Bé. nitric acid and 9.6 parts by weight of furfural were added to 181 parts by weight of water. The solution was heated to 150° F. and 6.9 parts by weight of urea added. The composition was digested at 200°–210° F. with agitation for 150 hours. The solution showed excellent polishing action on aluminum surfaces at 190° F., the action stopping in less than 1 second due to formation of an impermeable plastic film on the aluminum surfaces.

Example 19

Three hundred twenty-five parts by weight of a commercial partially polymerized urea-formaldehyde solution (25% urea, 60% formaldehyde) and 12 parts by weight of 42° Bé. nitric acid were added to 550 parts by weight of 85% phosphoric acid. The solution was heated to 150° F. and 113 parts by weight of urea added. This composition was digested at 175°–220° F. with agitation for 120 hours, an additional 20 parts by weight of 42° Bé. nitric acid being introduced in small portions from time to time. A viscous solution was obtained in which solids separated at temperatures below 70° F. but redissolved on warming.

When this concentrated solution was diluted with 1, 2 or 3 parts by weight of water, the diluted solutions exhibited good polishing action on reactive metals with the simultaneous formation of a plastic film on the metal surfaces.

Example 20

Twenty-six and one-half parts by weight of a commercial partially polymerized urea-formaldehyde solution (25% urea, 60% formaldehyde), 70 parts by weight of 85% phosphoric acid and 21 parts by weight of 42° Bé. nitric acid were added to 167 parts by weight of water. The solution was heated to 150° F. and 1.5 parts by weight of urea and 14 parts by weight of an 80% aqueous solution of phenol were added. The composition was digested at 190–200° F. for 150 hours to give a stable, homogeneous solution. The solution showed excellent polishing action on aluminum surfaces at 185° F., the action stopping in less than 1 second due to formation of an impermeable plastic film on the aluminum surface. After drying at about 300° F. a highly lustrous finish was obtained which exhibited significantly greater scratch resistance than a corresponding untreated aluminum surface. This film afforded excellent corrosion protection under severe conditions.

EXAMPLE 21

Twenty-five parts by weight of a commercial partially polymerized urea-formaldehyde solution (25% urea, 60% formaldehyde), 18 parts by weight of 85% phosphoric acid, 17.5 parts by weight of 42° Bé. nitric acid and 9 parts by weight of glycerol were added to 222 parts by weight of water. This mixture was heated to 150° F., 8.5 parts by weight of urea added and the composition digested at 190–200° F. for 20 hours. The stable solution obtained was cooled to room temperature and adjusted to pH 6 by addition of ammonium hydroxide. Specimens of magnesium die castings were dipped in this solution at room temperature for 2 seconds, rinsed with water and then dipped for 2 seconds at room temperature into a 10% adipic acid solution neutralized to a pH of 7.0–7.5 with NH$_4$OH. The specimens were then rinsed with water and dried at about 250° F. The magnesium surface was bright and a fairly heavy plastic film was formed on the magnesium which afforded significant corrosion protection when the metal specimen was immersed in a sodium chloride solution.

EXAMPLE 22

Twenty-five parts by weight of a commercial partially polymerized urea-formaldehyde solution (25% urea, 60% formaldehyde), 9 parts by weight of glycerol, 21 parts by weight of adipic acid, 71 parts by weight of 85% phosphoric acid and 12.5 parts by weight of 42° Bé. nitric acid were added to 153 parts by weight of water. This mixture was heated to 150° F. and 8.5 parts by weight of urea added and the composition digested with agitation at 190–210° F. for 12 hours to produce a stable solution. Panels of aluminum coated steel were heated to about 700° F. and dipped in this solution at 180° F. for 3 seconds, rinsed with water and dried at about 250° F. A very bright finish was obtained on the aluminum surface. The plastic film formed on the aluminum surface was harder and more scratch resistant than was the case in Example 8, otherwise the properties of the plastic film were about the same as in Example 8.

EXAMPLE 23

Five percent by weight of succinic acid was dissolved in solution A of Example 1. Panels of aluminum sheet were immersed in this solution at 185° F. for 5 seconds, rinsed with water, dipped in a solution containing 15% acetic acid and 15% methanol at 100° F. for 3 minutes, drained and dried to about 275° F. Normal polishing action was obtained. The plastic film produced on the aluminum surface exhibited a much higher interfacial tension with water and was significantly more resistant to corrosion under severe conditions than when the secondary treatment (acetic acid-methanol) was omitted.

EXAMPLE 24

Ninety-two parts by weight of 37% formaldehyde solution, 94 parts by weight of 70% hexamethylenediamine solution, 235 parts by weight of 85% phosphoric acid and 42 parts by weight of 42° Bé. nitric acid were mixed with 537 parts by weight of water. This solution was heated to 185° F., panels of aluminum sheet immersed in it for 5 seconds, rinsed with water and dried at about 250° F. Good polishing action was obtained. The plastic film produced on the aluminum surface was fairly thick, and appreciably softer than that obtained in Example 2.

A solution was prepared identical to the above except that the nitric acid was omitted. The polishing action of this solution was less than when nitric acid was employed, but other properties of the plastic film were about the same.

A solution similar to that above was prepared in which an equivalent amount of nitric acid was substituted for the phosphoric acid. The polishing action of this solution was somewhat less than when phosphoric acid was employed and the plastic film was appreciably thinner than in the case of phosphoric acid or the combination of phosphoric-nitric acids.

Another solution was prepared in which an equivalent amount of sulphuric acid was substituted for the nitric acid. The polishing action of this solution was less than in the case of nitric acid alone.

EXAMPLE 25

Twenty-five parts by weight of a commercial partially polymerized urea-formaldehyde solution (25% urea, 60% formaldehyde), 10.5 parts by weight of a 70% solution of hexamethylenediamine, 70 parts by weight of 85% phosphoric acid and 12.5 parts by weight of 42° Bé. nitric acid were added to 177 parts by weight of water. This composition was heated to 150° F., 5 parts by weight of urea added and digested at 190–200° F. for 30 minutes to obtain a stable solution. Panels of aluminum coated steel were dipped in this solution at 185° F. for 5 seconds, rinsed with water and dried at about 300° F. The polishing action of the solution was comparable to that obtained in Example 2. The properties of plastic film on aluminum surface were comparable to that in Example 2, except that it was slightly softer.

Three solutions were prepared in the same manner as above, one solution containing the indicated amount of phosphoric acid, the second containing an equivalent amount of nitric acid in lieu of the phosphoric acid and the third solution containing an equivalent amount of sulphuric acid in lieu of the phosphoric acid. The relationships between polishing action and characteristics of the plastic films produced with these three acids were the same as in Example 24.

EXAMPLE 26

Fifty-four parts by weight of a 37% solution of formaldehyde, 15 parts by weight of urea, 70 parts by weight of 85% phosphoric acid and 12 parts by weight of 42° Bé. nitric acid were mixed with 149 parts by weight of water. The composition was digested at 190–200° F. for 30 minutes, giving a stable solution. Panels of aluminum sheet were immersed in this solution at 185° F. for 5 seconds, rinsed with water and dried at 300° F. The polishing action and properties of the plastic film developed on the aluminum surface were the same as in Example 2.

Three solutions were prepared in the same manner as above, one solution containing the indicated amount of phosphoric acid, the second containing an equivalent amount of nitric acid in lieu of the phosphoric acid and the third solution containing an equivalent amount of sulphuric acid in lieu of the phosphoric acid. The relationships between polishing action and characteristics of plastic films produced with these three solutions were the same as in Example 24.

Example 27

Twenty-five parts by weight of a commercial partially polymerized urea-formaldehyde solution (25% urea, 60% formaldehyde), 71 parts by weight of 85% phosphoric acid, 12.5 parts by weight of 42° Bé. nitric acid, 15 parts by weight of adipic acid, 9 parts by weight of hexamethylenetetramine, and 8.5 parts by weight of urea were added to 159 parts by weight of water. This composition was digested at 190–200° F. for 30 minutes to produce a stable solution. Panels of aluminum sheet were dipped in this solution at 185° F. for 5 seconds, rinsed with water and dried at about 250° F. Polishing action and nature of plastic film obtained were good.

Three solutions were prepared in the same manner as above, one solution containing the indicated amount of phosphoric acid, the second containing an equivalent amount of nitric acid in lieu of the phosphoric acid and the third solution containing an equivalent amount of sulphuric acid in lieu of the phosphoric acid. The relationships between polishing action and nature of plastic film produced on the aluminum surface were the same as in Example 24.

Example 28

Fifty-six parts by weight of adipic acid, 53 parts by weight of a 70% solution of hexamethylenediamine, 235 parts by weight of 85% phosphoric acid and 42 parts by weight of 42° Bé. nitric acid were added to 614 parts by weight of water. Panels of aluminum sheet were immersed in this solution at 185° F. for 5 seconds, rinsed with water and dried at about 250° F. The polishing action of the solution was excellent and a tough, transparent, soft plastic film was developed on the aluminum surface which afforded excellent corrosion protection in a chloride-containing atmosphere.

Three solutions were prepared in the same manner as above, one solution containing the indicated amount of phosphoric acid, the second containing an equivalent amount of nitric acid in lieu of the phosphoric acid and the third solution containing an equivalent amount of sulphuric acid in lieu of the phosphoric acid. The polishing action of these solutions on the aluminum was comparable to that in Example 24 for the three acids and the nature of the plastic film developed on the surface was similar, but was thinner in the absence of phosphoric acid.

Example 29

Thirty-one parts by weight of adipic acid, 19 parts by weight of glycerol, 118 parts by weight of 85% phosphoric acid and 10 parts by weight of 42° Bé. nitric acid were added to 332 parts by weight of water. Panels of aluminum sheet were dipped in this solution at 185° F. for 10 seconds, rinsed with water and dried at about 300° F. Polishing action was excellent. A lustrous, fairly thin plastic film was developed. It was significantly harder and more scratch-resistant than plastic films produced in Example 2. It afforded excellent corrosion protection in a chloride-containing atmosphere.

Three solutions were prepared in the same manner as above, one solution containing the indicated amount of phosphoric acid, the second containing an equivalent amount of nitric acid in lieu of the phosphoric acid and the third solution containing an equivalent amount of sulphuric acid in lieu of the phosphoric acid. The polishing action of these solutions was comparable to that in Example 24 for the three acids. The nature of the plastic film developed in the three cases was about the same as in the case of the phosphoric-nitric combination.

Example 30

Thirty-four parts by weight of adipic acid, 16.5 parts by weight of pentaerythritol and 6 parts by weight of 85% phosphoric acid were added to 443.5 parts by weight of water, and digested at 170–180° F. for 30 minutes. Panels of magnesium sheet were dipped in this solution at 150° F. for 5 seconds, rinsed in water and dried at about 300° F. A brightening action was observed and a lustrous, hard plastic film was formed on the magnesium surface which afforded good corrosion protection in a chloride-containing atmosphere.

Example 31

Sixty-four parts by weight of pentaerythritol, 17 parts by weight of boric anhydride, 34 parts by weight of adipic acid and 28 parts by weight of fumaric acid were added to 851 parts by weight of water, and the composition digested at 180–190° F. for 30 minutes. Specimens of magnesium die castings were dipped in this solution at room temperature for 2 seconds, rinsed with water and dried at about 300° F. A fairly heavy, hard plastic film was developed, which afforded significant corrosion protection to the casting when immersed in a sodium chloride solution.

Example 32

Fifty-six parts by weight of a commercial partially polymerized urea-formaldehyde solution (25% urea, 60% formaldehyde) and 60 parts by weight of sulphamic acid were added to 184 parts by weight of water, and this composition digested at 180–190° F. for 30 minutes producing a stable solution. Panels of aluminum sheet were immersed in this solution at 185° F. for 10 seconds, rinsed with water and dried at about 300° F. The plastic film deposited improved the finish of the metal and afforded significant protection to the aluminum against dilute hydrochloric acid.

Example 33

Forty-six parts by weight of a commercial partially polymerized urea-formaldehyde solution (32.5% urea, 32.5% formaldehyde) and 60 parts by weight of sulphamic acid were added to 204 parts by weight of water, and the composition digested at 185–200° F. for 75 hours to obtain a stable solution. Panels of aluminum sheet were immersed in this solution at 185° F. for 10 seconds, rinsed with water and dried at about 300° F. The luster of the finish was superior to that in Example 32 while the corrosion protection afforded by the plastic film which formed was comparable thereto.

Example 34

To a composition as in Example 33 were added 15 parts by weight of adipic acid and 12 parts by weight of fumaric acid. Panels of aluminum sheet were dipped in this solution at 185° F. for 1 minute, rinsed with water and dried at about 300° F. A highly lustrous finish was obtained and the plastic film which formed was scratch and corrosion resistant.

Example 35

Panels of aluminum sheet were dipped in a solution of the same composition as described in Example 32 at 185° F. for 10 seconds, rinsed with water and then dipped in a solution containing 27.3 parts by weight of epichlorohydrin and 32.7 parts by weight of hydroquinone in 240 parts by weight of water at 185° F. for 1 minute, drained and dried slowly at a temperature of about 225° F. The plastic film was fairly lustrous, and the secondary resin which was deposited gave the final surface a whiter than normal appearance. Hardness and corrosion resistance of the plastic film were comparable to those in Example 32.

Example 36

Panels of aluminum sheet were immersed in a solution of the same composition as described in Example 34 at 185° F. for 1 minute, rinsed, heated to about 300° F. and then dipped in a solution containing 27.3 parts by weight of epichlorohydrin and 32.7 parts by weight of hydroquinone in 240 parts by weight of water at 185° F. for 2 seconds, rinsed with water and dried at about 225° F. A highly lustrous finish was obtained. There was no cloudiness in plastic film, as in Example 35, and the plastic film was harder and afforded better corrosion protection against dilute hydrochloric acid than that in Example 35.

Example 37

Five percent by weight of adipic acid was dissolved in solution "A" of Example 1. Panels of sheet aluminum were immersed in this solution for 5 seconds at 185° F., rinsed with water, dried and heated to 300–325° F. and then dipped in a solution containing 27.3 parts by weight of epichlorohydrin and 32.7 parts by weight of hydroquinone in 240 parts by weight of water at 185° F. A highly lustrous finish was obtained, superior to that in Example 36.

Example 38

Eighteen parts by weight of 85% phosphoric acid, 15 parts by weight of sulphamic acid, 15 parts by weight of adipic acid and 15 parts by weight of fumaric acid were dissolved in 198 parts by weight of water. This solution was heated to 175° F. and 25 parts by weight of a partially polymerized urea-formaldehyde composition added (25% urea, 60% formaldehyde). This solution was digested at 190–200° F. for 1 hour, 7.5 parts by weight of urea added and digestion continued for 15 hours. Specimens of aluminum sheet were heated to 500° F. and then immersed in this solution for 10 seconds, rinsed with water, immersed in a 10% solution of styrene monomer in ethanol for 15 seconds, drained and dried at about 300° F. A highly lustrous, mirror-like finish was obtained on the aluminum surface. The plastic film developed afforded excellent corrosion protection to the aluminum under severe conditions.

Other specimens of aluminum sheet were treated in the same manner except that methyl methacrylate monomer was substituted for the styrene monomer. The plastic film obtained on the aluminum surface in this case was considerably less lustrous and slightly softer than with the styrene.

Example 39

Eighteen parts by weight of 85% phosphoric acid, 15 parts by weight of sulphamic acid, 15 parts by weight of adipic acid and 15 parts by weight of fumaric acid were dissolved in 198 parts by weight of water. The solution was heated to 150° F. and 25 parts by weight of a partially polymerized urea-formaldehyde solution (25% urea, 60% formaldehyde) were added. This composition was digested at 190–200° F. for 1 hour and 7.5 parts by weight of urea added and digestion continued for 15 hours at this temperature. Six grams of styrene monomer dissolved in 10 grams of ethanol were emulsified in this solution. Specimens of aluminum sheet were heated to 500° F. and immersed in the above solution for 10 seconds, rinsed in water and dried at about 300° F. A plastic film was developed on the aluminum surface which was comparable in luster to that obtained in Example 38 but which was significantly more scratch resistant and somewhat more corrosion resistant to dilute hydrochloric acid.

The advantages of the invention as described in the foregoing paragraphs are manifest. The compositions and processes of the present invention are susceptible to wide variation to achieve a desired effect on the metals treated. For example, the thickness of the protective film on the metal can be controlled by the rate of reaction between the metal and the treating solutions of the invention and by the time the metal is immersed therein. The rate of reaction is determined by the nature of the reactive metal itself, the acidity of the bath, the resin content of the bath, the temperature of the bath, the temperature at which the metal is introduced and so forth. When the combination of conditions is such that the reaction is quite rapid, the reaction may continue indefinitely. This means that the resin originally deposited on the surface is dislodged by continued reaction. Under such conditions the thickness of the final plastic film amounts only to a few millionths of an inch. The various variables can be so adjusted that the reaction stops almost completely as soon as an appreciable thickness of the resin is deposited on the metal surface. This produces a film thicker than that obtained above, and considerably more impermeable. The conditions may also be adjusted so that the reaction continues at a fairly slow rate depositing a resin film with a thickness on the order of thousandths of an inch. This film may be consolidated and fixed by subsequent procedures. Thus it is possible to vary the thickness of the resin film over a wide range by suitable adjustment of the process variables.

The maximum chemical polishing action on the reactive metal is obtained when processing conditions are adjusted to give a continuous and rapid reaction between the bath and the metal. However, even with a very slow reaction between the metal and the bath an appreciable degree of polishing is obtained.

In the present application the expression "phosphoric acid-yielding component" embraces phosphoric acid and phosphate salts as described in which only the secondary or tertiary hydrogen atoms therein remain active. Likewise "resin-forming material" embraces unreacted components of a resin or resin components polymerized to any extent as long as they remain soluble in the aqueous treating composition.

Those modifications and equivalents which fall within the spirit of the invention and the scope of the appended claims are to be considered part of the invention.

We claim:

1. A composition for treating metal comprising an aqueous solution of from about 1 to about 50% by weight of a water-soluble organic resin-forming material selected from the group consisting of amine-aldehyde, polyamine-polycarboxylic acid, polyhydric alcohol-polycarboxylic acid, and copolymers htereof, and from about 1 to about 75% by weight of an inorganic oxyacid selected from sulphuric, sulphamic, boric, phosphoric, nitric and mixtures thereof, said resin-forming material being partially polymerized by heating in the presence of said oxyacid at a temperature of at least 175° F. for an extended period of time to form a stable solution.

2. A composition according to claim 1 wherein the resin-forming material comprises a mixture of an amine and an aldehyde.

3. A composition according to claim 1 wherein the resin-forming material comprises a mixture of a polyamine and a polycarboxylic acid.

4. A composition according to claim 1 wherein the resin-forming material comprises a mixture of a polyhydric alcohol and a polycarboxylic acid.

5. A composition according to claim 1 wherein the resin-forming material comprises a mixture of a urea and an aldehyde.

6. A composition according to claim 1 wherein a combination of phosphoric acid and nitric acid is employed as an inorganic oxyacid.

7. A composition according to claim 1 wherein the resin-forming material comprises a mixture of urea, an aldehyde and a polycarboxylic acid.

8. A composition according to claim 1 wherein the resin-forming material comprises a mixture of urea and an aldehyde and an unsaturated dicarboxylic acid and wherein the aqueous solution has dispersed or emulsified therein a styrene monomer.

9. A composition according to claim 1 wherein the amount of the water-soluble resin-forming material ranges from about 10 to about 30% by weight and wherein the inorganic oxyacid ranges from about 10 to about 30% by weight of the composition.

10. A composition in accordance with claim 1 wherein a mixture of nitric acid and a phosphoric acid yielding component is employed.

11. A composition for treating metal comprising an aqeuous solution of from about 10 to about 30% by weight of a water-soluble urea-formaldehyde resin and from about 10 to about 30% by weight of a mixture of nitric acid and phosphoric acid, said resin being partially polymerized by heating in the presence of said mixture of acids at a temperature of at least 175° F. for an extended period of time to form a stable solution.

12. A process for treating metal which comprises contacting said metal with an aqueous solution containing from about 1 to 75% by weight of an oxyacid selected from sulphuric, sulphamic, boric, phosphoric, nitric and mixtures thereof and from about 1 to 50% by weight of a water-soluble resin-forming material selected from the group consisting of amine-aldehyde, polyamine-polycarboxylic acid, polyhydric alcohol-polycarboxylic acid and copolymers thereof partially polymerized by heating in aqueous solution in the presence of said oxyacid and capable of forming a substantially water-insoluble resinous film upon the metal surface, said aqueous solution being capable of reacting at temperatures below 212° F. with the metal to be treated, contacting of said metal being carried out at a temperature below 212° F. for a time sufficient to effect reaction between said aqueous solution and metal to form a reaction product and to cause an interaction of said reaction product with said water-soluble resin-forming material to thereby deposit a water-insoluble resinous film on the metal surface, discontinuing contact of said metal with said aqueous solution and drying said treated metal.

13. The process of claim 12 wherein said treated metal is dried at an elevated temperature whereby curing of the resinous film is achieved.

14. The process of claim 12 wherein said coated metal prior to drying is immersed in water to remove excess inorganic oxyacid.

15. The process of claim 12 wherein the said inorganic oxyacid material is a mixture of nitric acid and a phosphoric acid yielding component.

16. The process of claim 12 wherein the said inorganic oxyacid material comprises a mixture of nitric acid and a phosphoric acid yielding component and wherein said water-soluble resin-forming material comprises a mixture of an amine and an aldehyde.

17. The process of claim 12 wherein the metal to be treated is heated to an elevated temperature below its softening point and immersed in said aqueous solution while heated.

18. A process for treating metal which comprises contacting said metal in an aqueous solution containing from about 1 to 75% by weight of an inorganic oxyacid selected from sulphuric, sulphamic, boric, phosphoric, nitric and mixtures thereof and from about 1 to 50% by weight of a water-soluble resin-forming material selected from the group consisting of amine-aldehyde, polyamine-polycarboxylic acid, polyhydric alcohol-polycarboxylic acid and copolymers thereof partially polymerized by heating in aqueous solution in the presence of said oxyacid and capable of forming a substantially water-insoluble resinous film upon the metal surface, said aqueous solution being capable of reacting at temperatures below 212° F. with the metal to be treated, contacting of said metal being carried out at a temperature below 212° F. for a time sufficient to effect reaction between said aqueous solution and metal to form a reaction product and to cause an interaction of said reaction product with said water-soluble resin-forming material to thereby deposit a water-insoluble resinous film on the metal surface, reacting a second reactable organic material with the resinous film on said metal surface to modify the nature of said film and finally drying said treated metal.

19. A process for treating metal which comprises contacting said metal with an aqueous solution containing from about 1 to 75% by weight of an inorganic oxyacid selected from sulphuric, sulphamic, boric, phosphoric, nitric and mixtures thereof and from about 1 to 50% by weight of a water-soluble urea-aldehyde mixture partially polymerized in the presence of said oxyacid, contacting of said metal being carried out at a temperature below 212° F. for a time sufficient to effect reaction between said aqueous solution and metal to form a reaction product and to cause an interaction of said reaction product with said urea-aldehyde mixture to thereby deposit a water-insoluble urea-aldehyde resinous film upon the metal surface, reacting a carboxylic acid with the urea-aldehyde resinous film on said metal to modify the characteristics thereof, and finally drying said treated metal.

20. A process for treating metal which comprises contacting said metal with an aqueous solution containing from about 1 to 75% by weight of an inorganic oxyacid selected from sulphuric, sulphamic, boric, phosphoric, nitric and from about 1 to 50% by weight of mixtures thereof and a water-soluble material selected from the group consisting of an amine-aldehyde mixture and a polyamine-polycarboxylic acid mixture, said mixtures being partially polymerized in the presence of said oxyacid, contacting of said metal being carried out at a temperature below 212° F. for a time sufficient to effect reaction between said aqueous solution and metal to form a reaction product and to cause an interaction of said reaction product with said amine-aldehyde mixture or polyamine-polycarboxylic acid mixture to thereby deposit a water-insoluble resinous film upon the metal surface and reacting an alkali metal fatty acid salt with said resinous film to modify the characteristics thereof and finally drying said treated metal.

21. A process for treating metal which comprises contacting said metal with an aqueous solution containing from about 1 to 75% by weight of an inorganic oxyacid selected from sulphuric, sulphamic, boric, phosphoric, nitric and from about 1 to 50% by weight of mixtures thereof and a water-soluble material selected from the group consisting of an amine-aldehyde mixture and a polyamine-polycarboxylic acid mixture, said mixtures being partially polymerized in the presence of said oxyacid, contacting of said metal being carried out at a temperature below 212° F. for a time sufficient to effect reaction between said aqueous solution and metal to form a reaction product and to cause an interaction of said reaction product with said amine-aldehyde mixture or polyamine-polycarboxylic acid mixture to thereby deposit a water-insoluble resinous film upon the metal surface and reacting an alkali metal salt of an aromatic acid or a phenol with said resinous film to modify the characteristics thereof and finally drying of said treated metal.

22. A process for treating metal which comprises contacting said metal with an aqueous solution containing from about 1 to 75% by weight of an inorganic oxyacid selected from sulphuric, sulphamic, boric, phosphoric, nitric and from about 1 to 50% by weight of mixtures thereof and a water-soluble material selected from the group consisting of an amine-aldehyde mixture and a polyamine-polycarboxylic acid mixture, said mixtures being partially polymerized in the presence of said oxyacid, contacting of said metal being carried out at a temperature below 212° F. for a time sufficient to effect reaction between said aqueous solution and metal to form a reaction product and to cause an interaction of said reaction product with said amine-aldehyde mixture or polyamine-polycarboxylic acid mixture to thereby deposit a water-insoluble resinous film upon the metal surface and reacting an alkali metal salt of a chlorinated aromatic acid or a phenol with said resinous film to modify the characteristics thereof and finally drying said treated metal.

23. A process for treating metal which comprises contacting said metal with an aqeuous solution containing from about 1 to 75% by weight of an inorganic oxyacid selected from sulphuric, sulphamic, boric, phosphoric, nitric and from about 1 to 50% by weight of mixtures thereof and a water-soluble resinous material selected from the group consisting of amine-aldehyde mixtures, polyamine-polycarboxylic acid mixtures and phenol-aldehyde mixtures, said mixtures being partially polymerized in the presence of said oxyacid, contacting of said metal being carried out at a temperature below 212° F. for a time sufficient to effect reaction between said aqueous solution and metal to form a reaction product and to cause an interaction of said reaction product with said water-soluble resin-forming material to thereby deposit a water-insoluble resinous film upon the metal surface, and then before curing treating said treated metal with a solution containing an epoxide compound and a polyhydroxyl compound and finally drying said treated metal.

24. A process for treating metal which comprises contacting said metal with an aqeuous solution containing from about 1 to about 75% by weight of an oxyacid selected from sulphuric, sulphamic, boric, phosphoric, nitric and mixtures thereof and from about 1 to about 50% by weight of a water-soluble unsaturated organic resin-forming material selected from the group consisting of polyamine-polycarboxylic acid, polyhydric alcohol-polycarboxylic acid and copolymers thereof which is partially polymerized by heating in aqueous solution in the presence of said oxyacid and capable of forming a substantially water-insoluble resinous film upon the metal surface, said aqueous solution being capable of reacting at temperatures below 212° F. with the metal being treated, contacting of said metal being carried out at a temperature and for a time sufficient to effect reaction between said aqueous solution and metal to form a reaction product and to cause an interaction of said reaction product with said unsaturated resin-forming material to thereby deposit a water-insoluble resinous film upon the metal surface, reacting styrene monomer with the unsaturated resinous film on said metal to modify the characteristics therof and finally drying said treated metal.

References Cited
UNITED STATES PATENTS

| | | | |
|---|---|---|---|
| 2,303,504 | 12/1942 | Ryan | 117—132 X |
| 2,019,834 | 11/1935 | Vierling et al. | 260—29.4 X |
| 2,190,239 | 2/1940 | Menger | 260—29.4 |
| 2,582,961 | 1/1952 | Burnell et al. | 260—29.4 X |
| 2,902,390 | 9/1959 | Bell | 148—6.2 |
| 3,053,691 | 9/1962 | Hartman | 148—6.1 X |
| 3,094,435 | 6/1963 | Schuster et al. | 148—6.2 X |
| 3,132,055 | 5/1964 | Tanaka et al. | 148—6.2 X |
| 3,136,663 | 6/1964 | McDonald | 148—6.15 |
| 3,140,204 | 7/1964 | Tokunaga | 148—6.2 |
| 3,197,344 | 7/1965 | Plaxton | 158—6.15 |
| 1,995,954 | 3/1935 | Albrecht | 117—132 |
| 2,411,590 | 11/1946 | Powell | 148—6.15 |
| 2,446,060 | 7/1948 | Pray et al. | 148—6.15 |
| 2,448,513 | 9/1948 | Brennan et al. | 117—132 |
| 2,993,807 | 7/1961 | Abott et al. | 117—72 |
| 3,074,833 | 1/1963 | Ericks | 156—315 |
| 3,123,582 | 3/1964 | Tryzna | 117—132 X |

FOREIGN PATENTS 160,715  1/1955  Australia.

OTHER REFERENCES

Ellis: The Chemistry of Synthetic Resins, vol. 1, page 589, Reinhold Pub. Corp., 1935.

RALPH S. KENDALL, *Primary Examiner.*

UNITED STATES PATENT OFFICE
CERTIFICATE OF CORRECTION

Patent No. 3,397,077                                                         August 13, 1968

Ernest R. Boller et al.

It is certified that error appears in the above identified patent and that said Letters Patent are hereby corrected as shown below:

Column 2, line 31, "diethylene" should read -- dimethylene --. Column 8, line 38, before "1 second" insert -- about --. Column 18, lines 18, 37, 56 and column 19, line 1, after "nitric", each occurrence, insert -- and mixtures thereof --. Column 18, lines 18 and 19, 37 and 38, 56 and 57 and column 19, lines 1 and 2, cancel "mixtures thereof and", each occurrence. Column 18, line 51, after "drying" cancel "of"; same column 18, line 73 and column 19, line 17, "aqeuous", each occurrence, should read -- aqueous --.

Signed and sealed this 7th day of April 1970.

(SEAL)
Attest:

Edward M. Fletcher, Jr.                                    WILLIAM E. SCHUYLER, JR.
Attesting Officer                                                   Commissioner of Patents